April 4, 1967 G. LEWIS ETAL 3,312,789
EAR CANAL HEARING AID
Original Filed Jan. 2, 1962 4 Sheets-Sheet 1

INVENTORS
GEORGE LEWIS
PASQUALE ARENA
BY
LeBlanc & Shur
ATTORNEY

April 4, 1967

G. LEWIS ETAL

3,312,789

EAR CANAL HEARING AID

Original Filed Jan. 2, 1962

INVENTORS
GEORGE LEWIS
PASQUALE ARENA
BY
LeBlanc & Shur
ATTORNEY

3,312,789
EAR CANAL HEARING AID

George Lewis, Garches, Seine-et-Oise, France, and Pasquale Arena, New Rochelle, N.Y., assignors, by mesne assignments, to Dahlberg Electronics, Inc., Golden Valley, Minn., a corporation of Minnesota
Continuation of abandoned application Ser. No. 163,786, Jan. 2, 1962. This application Feb. 3, 1966, Ser. No. 524,793
25 Claims. (Cl. 179—107)

This application is a continuation of copending application Ser. No. 163,786, filed Jan. 2, 1962, and now abandoned.

The present invention relates to an improved hearing aid, and more particularly to a self-contained ear canal hearing aid incorporating the entire microphone, amplifier, receiver, circuitry, power source, etc., in a tiny unit which is worn entirely within the ear.

Over the years, and particularly since the development of the electronic amplifier, there has been substantial effort by many persons and companies to develop small, efficient, inconspicuous hearing aids. Since the development of the transistor in the early 1950's there has been increasing emphasis on the development of even smaller hearing aids which are more compact, easier to carry, and concealed in use to overcome the objections to conspicuousness which many hard-of-hearing persons have with regard to hearing aids. Hearing aids have been incorporated in eyeglasses, in "behind-the-ear" units, in units worn in ladies' hair, etc.

In addition, there has been substantial effort along the lines of developing a self-contained hearing aid unit with power source which may be worn entirely in the ear. United States patents showing hearing aids seeking to fulfill this objective may be found in Class 179, subclass 107, of the United States Patent Office. However, various "in-the-ear" hearing aids heretofore available have been characterized by a number of shortcomings and disadvantages. Among other things, a suitable in the ear hearing aid should be so small that a standard model lending itself to volume production will comfortably fit within the ear of 50% of adults, without projecting beyond the plane of the outer surface of the ear; but this has not been achieved heretofore. Also, prior "in the ear" hearing aids are of rigid shape and design whereby they do not allow or compensate for the difference in ears of individuals, and are thus restricted as to fit and comfort.

It is therefore a principal object of the present invention to provide a new improved full performing hearing aid of very small size which may be comfortably worn within the concha of the ear with its receiver disposed in the ear canal, and which overcomes shortcomings of the most comparable hearing aids heretofore available and provides a number of important advantages not achieved by such prior hearing aids, as hereinafter amplified.

More specifically, it is a primary object of the present invention to provide a tiny unitary self-contained hearing aid that includes a receiver which fits in the ear canal, and an associated unit incorporating microphone, amplifier, volume control, circuitry, battery, etc., which fits snugly in the concha of the ear. It is a related object to provide such an improved hearing aid of such small size that a standard production instrument will be disposed entirely within the plane of the ear, without protruding, whereby the hearing aid cannot be seen from front or back, for at least 50% of all adults. It is another related object of this invention to provide such an improved "ear canal" hearing aid which is so light (less than one-quarter ounce) that it is comfortable and unnoticed by the user.

It is another object of this invention to provide such a new improved unitary, but non-rigid, hearing aid incorporating a receiver sub-assembly which is flexibly mounted in articulated manner on the main housing of the hearing aid, thus permitting the receiver assembly to be directed into the ear canal of each individual, regardless of the variations of direction of the ear canal with respect to the concha typically encountered with different persons, whereby a given standardized design will fit a larger number of people. It is a related object to provide such a new ear canal hearing aid incorporating a novel soft rubber housing that provides an articulated mounting for a self-seating receiver, and also serves to dissipate vibrations between the receiver and the main microphone and ampifier portion of the hearing aid, thus improving hearing aid performance. It is another related object to provide such an improved tiny "ear canal hearing aid" in which objectionable feed-back is minimized. In addition, it is yet another related object to provide such an "ear canal" hearing aid which utilizes a standardized ear tip made in various sizes to seal the sound passing from the receiver to the ear canal thus preventing feed-back, and which is removable for the purpose of cleaning and the like.

It is another important object of this invention to provide such a new improved ear canal hearing aid in which the receiver sub-assembly incorporates a novel acoustical labyrinth which extends the length of travel of the sound leaving the receiver and passing into the ear canal, thereby providing improved low frequency receiver response and better tone quality.

It s still another object of the present invention to provide a new arrangement which integrates the assembly of housing parts and spring contact members and utilizes the latter to replace normal plastic walls and partitions, thus achieving substantial reduction in size of the hearing aid unit. It is a related object to provide a more compact unit whose components may be cemented together to minimize bulk, with elimination of need for additional fastening means, such as screws.

It is yet another object of the present invention to provide such a compact new improved ear canal hearing aid which is disposed entirely within the ear, yet has a readily accessible and efficient volume control.

It is yet another object of the present invention to provide such a compact ear canal hearing aid incorporating a simplified battery holder, with elimination of holder operating finger tabs, and elimination of other projections that would be noticeable and unsightly when the unit is worn in the human ear. It is a related object to provide an improved "in the ear hearing aid" in which the on-off switch is eliminated; and to provide a novel hearing aid which is adapted to be carried in a box supplied with the aid and having means for displacing the battery holder, thereby turning the set off, and making it convenient to remove the holder to replace the battery if desired.

It is still another object of the present invention to provide a new type of carrying case having an ejection pin that automatically displaces the battery, and turns off the hearing aid when it is stored.

It is another object to provide such a tiny comfortable ear canal hearing aid which however has good tonal quality, provides high gain, and has a good frequency response curve (acuostic gain in db plotted against frequency in cycles per second), with extended low frequency response by virtue of its novel receiver-acoustic labyrinth. It is another related object to provide such a high performance ear canal hearing aid which may be used for losses to 50 db, and has a gain of 25 db (HAIC), and output of 114 db (HAIC), with frequency range of 420 c.p.s. to 4200 c.p.s (HAIC), and has long battery life, notwithstanding its tiny size.

It is yet another object of this invention to provide such a new ear canal hearing aid comprising improved microphone-amplifier, and receiver, sub-assemblies which make possible an improved, compact, full performance, standardized design instrument.

It is still another object of the present invention to provide such a new improved "ear canal" hearing aid which may be made in a standard design and size for the right and left ears, respectively, for the majority of adults, thereby lending itself to volume production, and ready fitting, so that this new improved hearing aid can be competitively made and sold at a reasonable price to the hard-of-hearing.

Still other objects and advantages of the present invention will be apparent from the following description thereof with reference to the accompanying drawings and the appended claims.

In the drawings.

It is noted that throughout the drawings, like parts are identified by like numerals.

Figure 1:
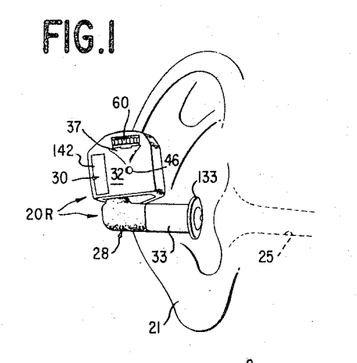
FIGURE 1 is a perspective view showing part of a right human ear and a right ear hearing aid unit according to the present invention about to be inserted into the ear.
Figure 1A:
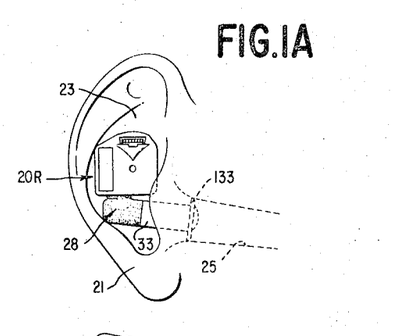
FIGURE 1A is a perspective view similar to FIGURE 1, illustrating the hearing aid unit of the present invention disposed within the concha of the outer ear with the receiver and ear tip thereof disposed within the ear canal of the user.
Figure 2:
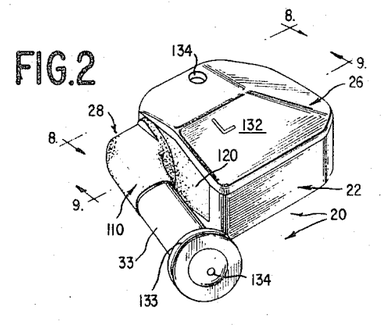
FIGURE 2 is a perspective view showing a complete ear canal hearing aid unit per this invention, with ear tip, for the left ear, looking at the "rear" of the unit which is normally disposed against the inside of the ear concha (the "front" of the hearing aid unit being shown in FIGURES 1 and 1A)

Referring to the drawings, particularly FIGURES 1, 1A and 2, the new improved unitary ear canal hearing aid of the present invention is generally designated by the numeral 20 for a left ear unit, and by the numeral 20R for a right ear unit. The ear canal hearing aid instrument of this invention is made in both right and left ear models to achieve a perfect fit for most adults with a standardized instrument, using one of a plurality of standardized ear tips. The construction of the right ear hearing aid instrument 20R is like that of the left ear hearing aid instrument 20 which will be particularly described with reference to FIGURES 2–9; however, various components of the right ear instrument 20R are of "reverse construction" in a manner which will be apparent to those skilled in the art in light of the drawings and description herein.

Referring to FIGURES 2 and 4–11 (especially FIGURES 4 and 5), the hearing aid instrument 20 of the present invention comprises: a main "front" housing, generally indicated by the numeral 22, and usually made of suitable plastic material; a chassis sub-assembly which is generally indicated by the numeral 24 and includes amplifier components, contact springs, microphone, volume control, etc.; a "rear" housing member 26, usually made of suitable plastic material; a receiver sub-assembly generally indicated at 28 which includes an acoustic labyrinth and resilient articulated mounting; a removable battery holder 30 which provides an on-off switch; and an ear tip 33 (FIGURE 2).

The main front housing 22 has a configuration which will be apparent from the drawings (especially FIGURES 4 and 7), and includes an end wall 32 and side walls 34, 36, 38, 40 and 42. Referring particularly to FIGURES 4, 7 and 9, the end wall 32 is provided with a sound inlet opening 46, and a concentric annular recess 48 which is adapted to receive a grill 50 and a resilient ring 52 for suspending a microphone 54, as hereinafter more fully discussed. The end wall 32 is also provided with a substantially rectangular aperture 56 to permit insertion of the battery holder 30 and a battery contained therein which is illustrated in phantom at 31 in FIGURE 8, as hereinafter more fully discussed. End wall 32 is also provided with a substantially trapezoidal opening 58 through which a volume control operating knob 60 extends when the hearing aid is assembled. The outer surface of end wall 32 is flared outwardly slightly, as illustrated at 37 in FIGURES 1 and 3A, and the inside of this flared portion of housing 22 is concave curved (forming two projections 61) to accommodate the portion of volume control 59 on which the operating knob 60 is rotatably mounted. (See FIGURES 6, 7 and 9.)

The front housing side wall 42 is provided with a cutout 62 and is also recessed at 64, thus providing a short wall section 43 of reduced thickness, for reasons hereinafter more fully discussed. The interior of side wall 38 is provided with an abutment 70 for supporting sub-assembly 24 at the proper level within front housing 22, and another abutment 72 is provided at the interior corner between side walls 34 and 36 for like reason. The lower portion of abutment 70 is provided with a small projection 71 which extends into battery receiving recess 56 and is adapted to cooperate with a cut-out 35 extending along one side of battery holder 30 (see FIGURES 8 and 8A), as hereinafter more fully discussed. The interior of side wall 36 is provided with an internal recess 74 which accommodates the shaft of volume control unit 59 and the retaining ring securing the operating knob 60 thereto.

Referring now especially to FIGURES 4 and 6–9, sub-assembly 24 comprises: a chassis assembly 76 including the amplifier components mounted on a base plate 78 and electrically connected in accordance with the wiring diagram of FIGURE 12, as hereinafter more fully discussed; a first contact member 80 having a configuration as shown, and providing the negative battery spring contact in the disclosed embodiment; a second contact member 82 having a configuration as shown, and providing the positive battery spring contact in this embodiment; volume control 59; microphone 54; and other related parts as more fully discussed below.

The base plate 78 of chassis assembly 76 is provided with a rectangular aperture 79; and a plurality of electrical components, such as resistances, and capacitances, indicated at 84, are mounted on a slant within this aperture, as will be especially apparent from FIGURES 4 and 9. A plurality of other electrical components such as transistors, resistors, and capacitors, indicated at 86, are also mounted on the top of chassis base plate 78, as is apparent from FIGURES 4 and 9. The underside of chassis plate 78 is provided with a suitable printed circuit, and the transistors, capacitors and resistors 84 and 86 mounted on this plate are suitably soldered in the circuit in accordance with the wiring diagram of FIGURE 12, thereby also securing elements 84 and 86 in the chassis 76.

Figures 4, 7, 9:
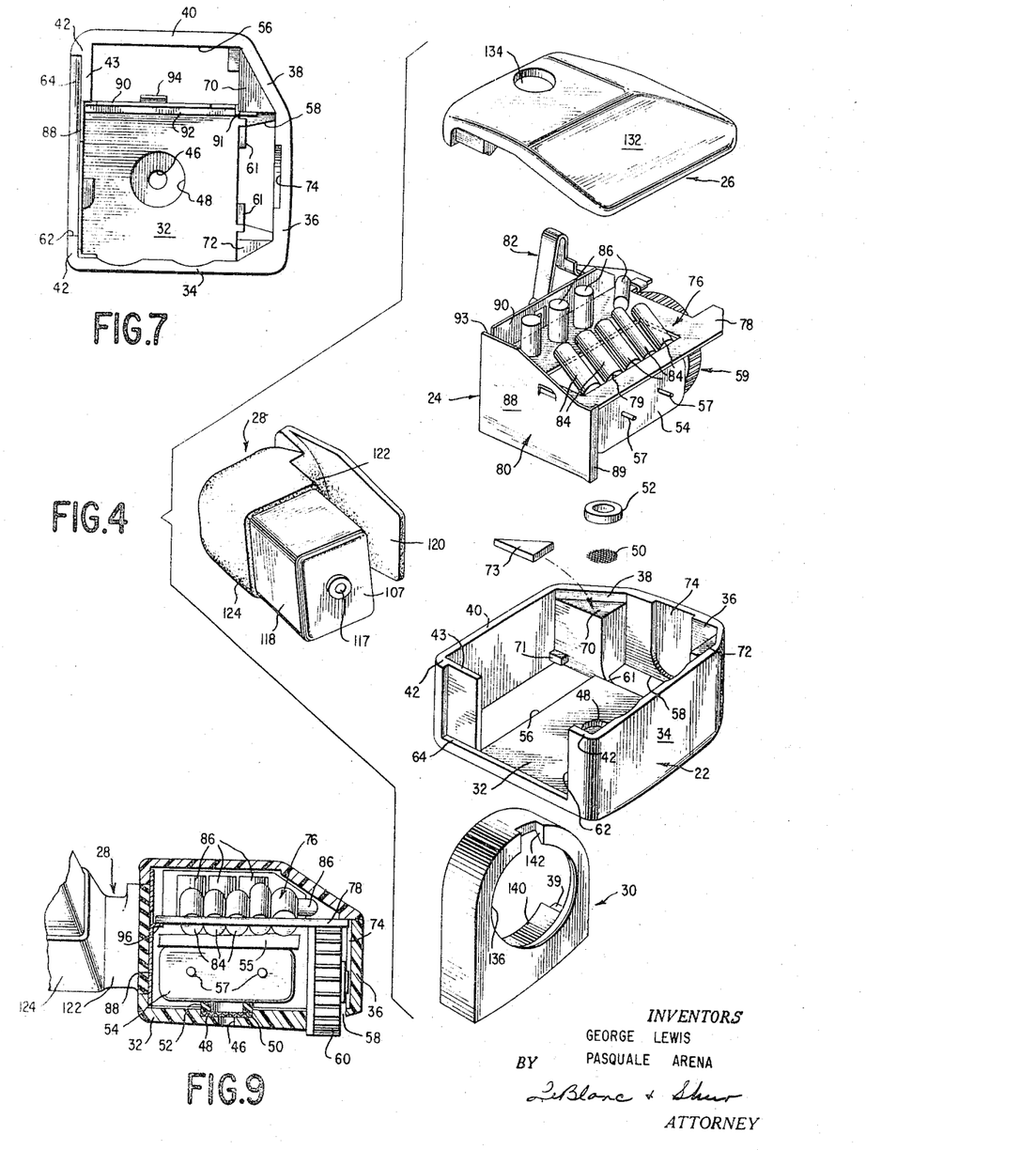
FIGURE 4 is an exploded perspective view showing principal hearing aid components, including the rear housing cover, the electronic chassis sub-assembly and battery contacts, microphone, the front housing, the receiver sub-assembly with its resilient articulated receiver housing and mounting member, and the battery holder.
FIGURE 7 is a top plan view of the front housing of the hearing aid, particularly illustrating how the negative spring fits into this housing and forms a wall and partition in said housing.
FIGURE 9 is a vertical sectional view taken substantially along line 9—9 in FIGURE 2, and showing the arrangement of electronic chassis, microphone, volume control and other components within the hearing aid's main amplifier unit.
Figure 5:
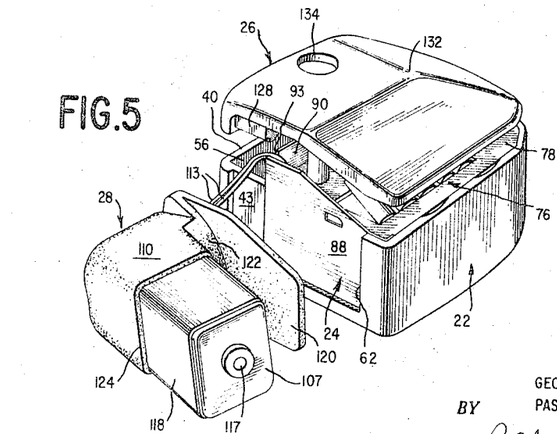
FIGURE 5 is a partially exploded perspective view of a left ear hearing aid unit according to the present invention, showing the front housing with a chassis assembled therein, the receiver sub-assembly wired to the chassis, and the rear housing.

The contact member 80 includes an enlarged side 88 which has a small flange 89 extending laterally from one end, and an enlarged side 90 which has a small right angle section 91 extending from one end with a small flange 92 extending inwardly from the bottom thereof. The configuration and size of the contact member 80 permits it to be seated inside the front housing 22 as shown in FIGURE 7, whereby sub-assembly 24 may be disposed within the housing 22 as illustrated in FIGURE 5 in final assembly. (It is noted that FIGURE 7 shows how the contact member 80 fits into the main front housing 22, but that this figure does not correspond to the actual mode of assembling the hearing aid as elsewhere herein described.) Side 90 of contact member 80 is provided with an outwardly projecting spring tongue contact 94 that is adapted to engage the flat negative face of a small cylindrical battery (31) when holder 30 containing a battery is installed within the recess 56 of hearing aid unit housing 22, between wall 40 and partition 92. Side 88 of contact member 80 is provided with a small inwardly projecting tab 96 which is soldered to a portion of the printed circuit on the underside of the chassis plate 78. Thus, the tab 96 serves to electrically connect the battery contacting spring tongue 94 with the circuitry of chassis 76, per FIGURE 12 described below; and tab 96 also serves as a support for chassis 76, as is especially apparent in FIGURE 9.

Figures 6, 6A:
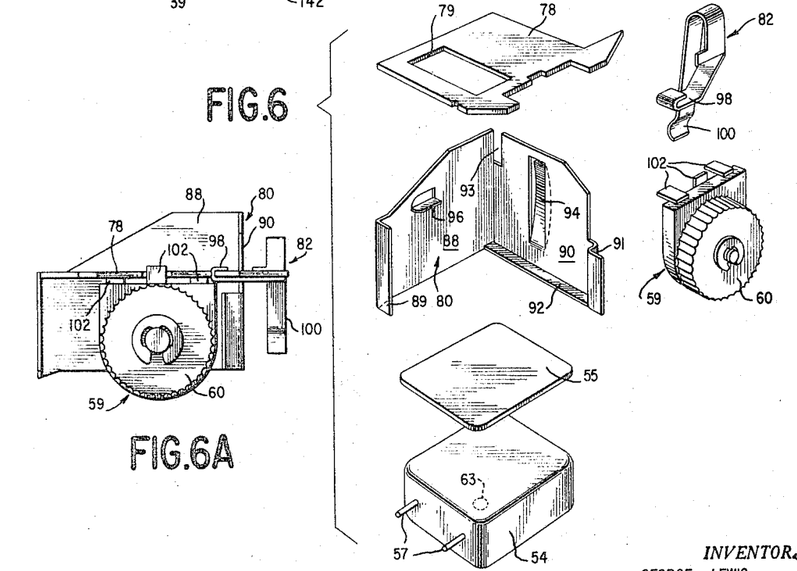
FIGURE 6 is an exploded view of the amplifier chassis base plate, the positive and negative battery springs, volume control, and microphone with its suspension plate.
FIGURE 6A is a side elevation view of the aforementioned components shown in FIGURE 6, illustrating how they are assembled.
Figure 12:
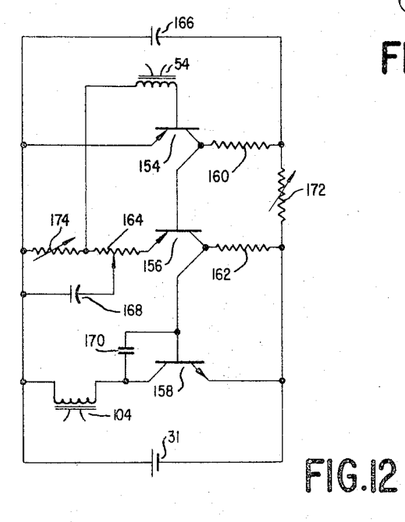
FIGURE 12 shows a circuit diagram for a preferred embodiment of the ear canal hearing aid of this invention.

The other contact member 82 has a J-shaped end portion 98 which is soldered to the underside of chassis plate 78, as shown particularly in FIGURES 6 and 6A, thus electrically connecting this member with the hearing aid circuitry, in accordance with FIGURE 12. Resilient spring contact tongue 100 of member 82 is adapted to engage the side of battery 31, which is positive, when the holder 30 containing a battery is fully inserted in hearing aid recess 56. However, spring contact tongue 100 is of such size and so disposed that it will not engage battery 31 when the battery holder 30 is partially removed from that recess, as when the hearing aid unit 20 is in its hearing aid case as shown in FIGURE 3A, thus cutting off power supply.

It will be noted that, when the sub-assembly 24 is disposed within the hearing aid front housing 22, side 88 of the contact member 80 forms a continuation of the side wall 43, and that the side 90 of contact member 80 forms a partition between the main portion of front housing 22 and battery holder receiving aperture 56, thus eliminating portions of the housing which would normally be included. This makes it possible to achieve a more compact hearing aid.

Referring now particularly to FIGURES 6 and 6A, the volume control 59 is mounted on the chassis 76 by soldering electrically conductive tabs 102 to the upper and/or lower sides of chassis plate 78 and to leads of other circuit elements in chassis assembly 76, in accordance with the wiring diagram of FIGURE 12 below described. The volume control 59 may be of any suitable commercially available type, and the details thereof are not themselves a part of the present invention, whereby further discussion thereof is deemed unnecessary.

Referring particularly to FIGURES 4, 6 and 9, the previously mentioned rubber microphone suspension ring 52 is secured to one side of microphone 54 by suitable adhesive, and a suspension pad 55 of rubber or other suitable resilient material is secured by suitable adhesive to the other side of the microphone 54, whereby microphone 54 is insulated from vibration. These parts 52, 54 and 55 are assembled in true centered relationship with resilient ring 52 surrounding the sound inlet aperture 63 of microphone 54. The microphone contacts 57 are electrically connected to elements of chassis assembly 76 in accordance with the circuit diagram of FIGURE 12. The resilient suspension ring 52 and the microphone grill 50 are secured to the housing end wall 32 by suitable adhesive; and sub-assembly 24 is mounted within the front housing 22, with chassis plate 78 being supported by abutments 70 and 72 and projection 96 of contact member 80. The top surface of chassis plate 78 is flush with or below the upper edges of front housing 22, as will be especially apparent from FIGURES 4, 5 and 9. If desired, a spacer or shim 73 may be interposed between abutment 70 and the bottom of chassis base plate 78, as illustrated in FIGURE 4, so that the sub-assembly 24 is at the desired level.

Referring now to FIGURES 2, 4, 5 and 9–11, the receiver sub-assembly 28 comprises: a suitable receiver unit 104; a novel acoustic labyrinth receiver cover 106, which is preferably L-shaped; an interposed cover plate 108; a resilient, articulated receiver housing and mounting member 110; and related parts as below discussed.

The receiver unit 104 is of any suitable conventional type, and includes a pair of terminals 112 for electrical leads 113, and a sound outlet 114. The particulars of receiver 104 are not a part of this invention, and the selection of an appropriate receiver will be apparent to those skilled in the art in light of the disclosure herein, wherefore further detailed description of receiver unit 104 is deemed unnecessary.

Receiver cover plate 108 is made of suitable material, such as plastic, and is secured to the receiver unit 104 by suitable adhesive, with cover plate aperture 109 overlying the receiver outlet 114 so as to permit passage of sound therethrough. The L-shaped acoustic labyrinth member 106 is secured to the other side of the cover plate 108 by a suitable adhesive, with the receiver outlet 114 in communication with one end 116 of the sound passage labyrinth groove 115 that is formed on the inside of member 106 and communicates with the sound outlet aperture 117 in the laterally extending end 107 of member 106. (See especially FIGURES 10 and 5). The seal between the receiver unit 104, cover plate 108, and acoustic labyrinth cover 106 should be made complete to avoid leakage of sound travelling from the receiver unit outlet 114 through labyrinth passage 115 to sound outlet aperture 117, as such leakage would adversely affect the performance of the hearing aid 20. (Acoustic labyrinth member 106 is preferably molded of plastic or like material in the form shown in the drawings, but can be made of other material and can have a differently shaped labyrinth passage.)

Figures 10, 10A, 11:
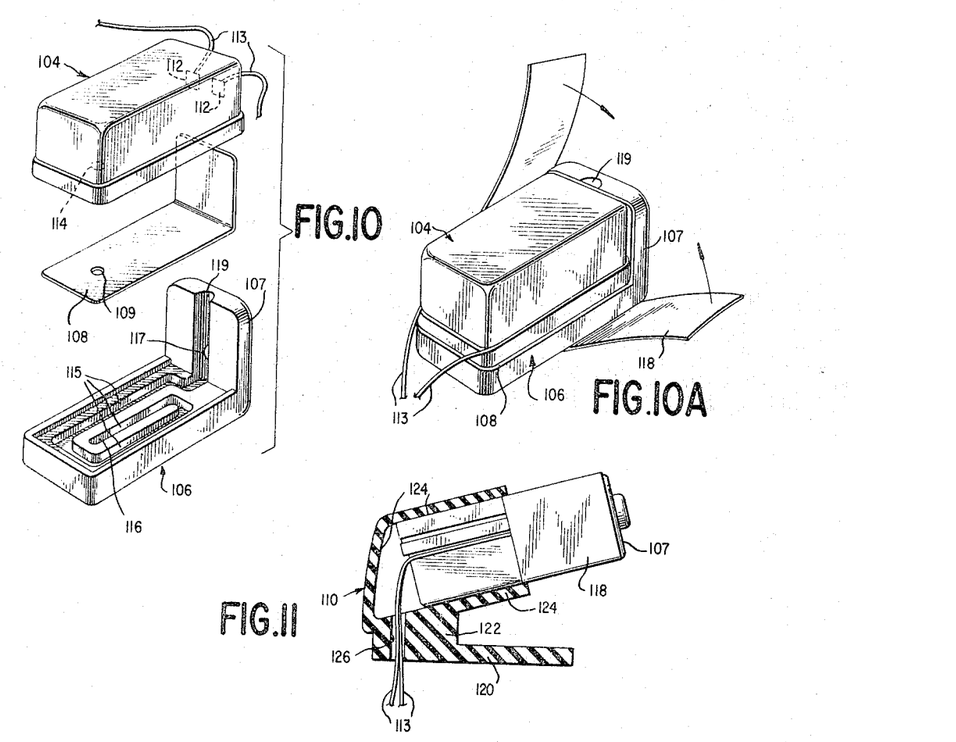
FIGURE 10 is an exploded view showing the receiver and acoustical labyrinth sub-assembly utilized in the hearing aid of this invention.
FIGURE 10A is a perspective view illustrating the assembly of said receiver and acoustical labyrinth sub-assembly.
FIGURE 11 is a vertical partial sectional view along the length of the receiver unit illustrating how it is mounted within the resilient receiver housing.

Referring especially to FIGURES 10A and 11, leads 113 are extended back along the sides of receiver unit 104, and a strip 118 of suitable material, like metal foil, is wrapped around the sub-assembly comprising units 104, 108, and 106, over the end 107 of acoustic labyrinth member 106. This closes off end 119 of labyrinth groove 115, thereby preventing leakage of sound therefrom, and also provides a neater receiver end for mounting of ear tip 33.

Referring especially to FIGURES 5, 8, 9 and 11, the receiver housing and mounting member 110 is made of a suitable resilient material like rubber, with a configuration as shown in the drawings. Thus, receiver mounting member 110 includes a relatively large base plate section 120 having a flat underside, a relatively short post section 122 extending laterally from base plate section 120, a rectangular hood section 124 extending laterally from post section 122, and a passageway 126 extending between the inner end of hood section 124 and the lower surface of base plate section 120. In making up receiver assembly 28, the hood section 124 of the receiver housing 110 may be folded back so that the leads 113 of receiver unit 104 can be inserted through slot 125; and the sub-assembly including receiver and acoustic labyrinth components 104, 108 and 106 is secured to an inside portion of hood 124 by suitable adhesive. Thereafter, the folded back portion of the receiver housing hood 124 is unfolded so that it closely fits around the receiver sub-assembly 104, 106, 108, as shown especially in FIGURES 5, 8 and 11.

Figure 8:
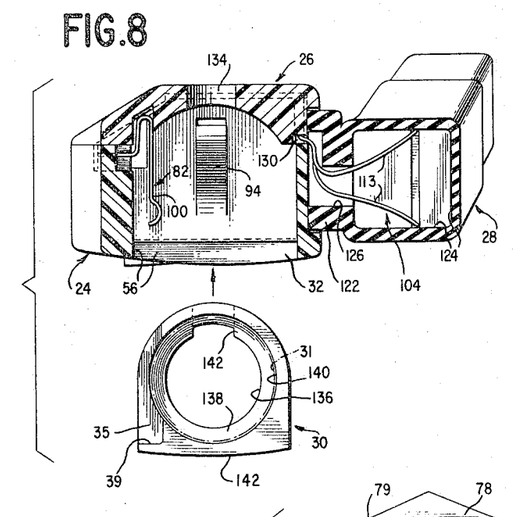
FIGURE 8 is a vertical cross-sectional view of the hearing aid taken substantially along line 8—8 in FIGURE 2, and also showing the battery holder and its cooperative relationship with the positive and negative contacts of the hearing aid.

Referring particularly to FIGURES 5 and 8, the receiver leads 113 are soldered to the chassis 76 in accordance with the wiring diagram of FIGURE 12 further described below. It will be noted that the contact member 80, which forms two walls in front housing part 22 as above described, is provided with a notch 93 to accommodate the receiver leads 113 passing from the receiver assembly 28 to the chassis assembly 76. (See especially FIGURES 4, 5 and 6.) The receiver assembly 28 is thereafter mounted on the side of the hearing aid housing 22 by securing the base 120 of resilient receiver mounting member 110 to substantially co-planar surfaces of contact member side 88 and wall 43, using a suitable adhesive.

The previously mentioned rear housing 26 of hearing aid 20 has a suitable configuration which will be apparent from the drawings (especially FIGURES 2, 4, 5, 8 and 9), whereby rear housing 26 will compactly enclose the components of the hearing aid instrument disposed within main front housing 22 as above described. The inner edges of the rear housing 26 are formed so that they may be tightly secured by suitable adhesive to the upper edges of sides 34, 36, 38, 40 and 42 of front housing 22, and also to the upper sides of plates 88 and 120 of members 80 and 110, respectively. It is noted, however, that rear housing inside portion 128 which overlies the wall section 43 of main front housing 22 is sized so as to provide a slight clearance 130 to accommodate the leads 113 extending between the receiver unit 104 and the chassis assembly 76 (FIGURE 8). Rear housing 26 may be designed so that it will clamp chassis base 78 in place between a portion of housing 26 and abutments 70 and 72 in front housing 22, as will be apparent from FIGURES 9 and 4. The outer surface 132 of the rear housing 26 is formed so that it will comfortably fit against the inner wall of the concha of the user's ear when installed as shown in FIGURE 1A. The rear housing 26 is also provided with an aperture 134 which overlies the battery recess 56 between front housing wall 40 and partition 90 to provide for ejection of battery holder 30 disposed therein, thereby cutting off power for the hearing aid 20. It will be noted that, as illustrated in FIGURE 2, the rear housing 26 may be marked with the letter L or R so as to conveniently indicate that the hearing aid unit is for the left or right ear, as the case may be.

Figure 8A:
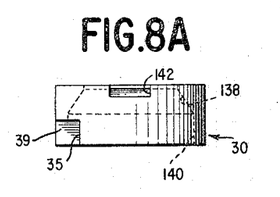
FIGURE 8A is an end view of the battery holder shown in FIGURE 8.

Battery holder 30 has a configuration as shown in the drawings, especially FIGURES 4 and 8 and 8A, for accommodation of a suitable commercially available battery 31, such as hearing aid battery No. RM312 sold by the Mallory Battery Company of Cleveland, Ohio. Holder 30 is provided with a central aperture 136 and surrounding annular beveled portion 138 and cylindrical portion 140; thus, the battery 31, which has a similar shape, will be properly seated by the user with its negative face within oepning 136 whereby it will engage the negative contact spring tongue 94 when the holder 30 is inserted in the recess 56 of front housing 32. Battery holder 30 is provided with a slot 142 which accommodates contact spring tongue 94 when holder 30 is inserted in the hearing aid recess 56. The side of batttery holder 30 is also provided with the aforementioned cut-out 35 which permits the positive side of a battery 31 disposed in holder 30 to engage the positive spring contact tongue 100 when holder 30 is fully inserted within the hearing aid housing. A small projection 39 extends across the end of holder side slot 35 and is adapted to engage the projection 71 in recess 56 in front housing 22 (FIGURE 4) to limit the extent of insertion of battery holder 30, whereby its outer end 142 will be flush with the outer surface of front housing end wall 32, as illustrated in FIGURES 1 and 1A.

Referring now to FIGURES 1 and 1A, and 2, the standardized ear tip 33 for the hearing aid receiver assembly 28 is made of a suitable flexible material, like rubber or plastic, and is generally cup-shaped so that its elongated section can be fitted over the foil-covered receiver end 118. The end of the cup-shaped tip 33 is provided with an annular flange 133 for better sealing with ear canal 25 of the hearing aid user, and also has an aperture 134 in the end thereof to permit passage of sound from the receiver—acoustic labyrinth outlet aperture 117 into the ear canal 25. The inside diameter of the elongated cylindrical section of ear tip 33 is of such size that the ear tip will fit snugly around the receiver end 118. The length of ear tip 33 is sufficient to allow a comfortable acoustic seal in ear canal 25, while at the same time allowing the main part of the hearing aid (within housing 22, 26) to fit inside the auricle cavity with rear surface 132 against the wall of the concha. The ear tip 33 may be provided in a number of standardized sizes, such as small, medium and large, with standard lengths which can be shortened as needed for different individuals by carefully cutting off small sections from the rear cylindrical portion of ear tip 33. The ear tip 33 is preferably removably applied to the receiver unit end 118 by means of a snug fit, and without adhesive, whereby tip 33 can be removed for cleaning or for changing size. If desired, the hearing aid may be provided with a personalized ear mold tip in lieu of the described standardized tip 33, in a manner which will be apparent to those skilled in this art in light of the disclosure herein.

Figure 3:
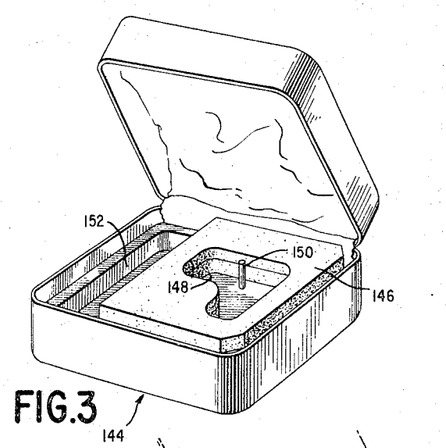
FIGURE 3 is a perspective view of a carrying case for a left ear hearing aid according to the present invention (such as shown in FIGURE 2), and shows the pin for turning off the hearing aid by displacement of the battery holder.
Figure 3A:
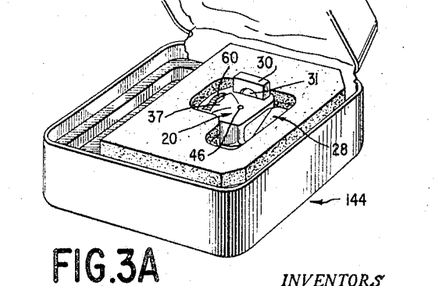
FIGURE 3A is a perspective view of the carrying case similar to that of FIGURE 3, but with the hearing aid unit of this invention inserted in the case, and the battery holder displaced, thus shutting off the hearing aid unit.

Reference is now made to FIGURES 3 and 3A, which show a carrying case 144 for the above-described left ear hearing aid 20. Case 144 is provided with a pad 146 made of suitable material and has a cut-out 148 that is appropriately shaped and proportioned to accommodate hearing aid 20 in such manner that the main part of the hearing aid and receiver assembly 28 will be disposed in case 144 as shown in FIGURE 3A. The portion of cutout 148 which is adapted to receive the main part of the hearing aid (within housing 22, 26) is provided with an upstanding battery ejection pin 150, as shown especially in FIGURE 3. When the ear canal hearing aid 20 is removed from the ear and is not in use, it is placed within the cut-out 148 of carrying case 144, with the rear housing 26 disposed downwardly, in such manner as to cause pin 150 to enter the aperture 134. The battery holder 30 is thus forced out of the hearing aid 20 by pin 150 as illustrated in FIGURE 3A, to a sufficient extent so that the battery 31 will no longer contact the spring tongue 100 (and/or spring tongue 94), said contact spring tongue(s), battery holder and pin 150 being suitably dimensioned to accomplish this. Thus, hearing aid carrying case 144 forms a part of the on-off switch mechanism of the ear canal hearing aid 20. To change batteries, the ejector pin 150 of the hearing aid carrying case 144 is used to displace the battery holder which can then be removed for discarding of the used battery and insertion of a new battery. Of course, the carrying case 144 serves to help keep the hearing aid 20 clean and free of damage when not in use. Left and right carrying cases are provided for left and right hearing aids, respectively; and it will be apparent, a carrying case for a right ear hearing aid is a "reversed design" of the left carrying case shown in FIGURES 3 and 3A. In addition, carrying case 144 is preferably provided with a recess 152 for accommodating a package of replacement batteries.

Reference is now made to FIGURE 12 which is a diagram of a suitable circuit for a hearing aid 20, whereby the sound input to microphone 54 is amplified prior to output from the receiver unit 104 when battery 31 is in "on position." The amplifier circuitry of chassis 76 includes: first and second stage transistors 154 and 156 of PNP type; a third stage transistor 158 of NPN type; resistances 160, 162 and 164; capacitors 166, 168 and 170; and variable resistances 172 and 174 which are part of potentiometer type volume control 59. These electrical components are of suitable values to produce desired performance characteristics for hearing aid 20, and are electrically connected in accordance with FIGURE 12, as will be apparent to those skilled in the art in light of the disclosure herein.

In fitting the hearing aid, the proper ear for best results is selected after suitable known tests, and a left or right hearing aid unit 20 or 20R is used accordingly. With the hearing aid unit 20 (or 20R) removed from its carrying case 144, the battery holder 30 is pushed in all the way to turn on the hearing aid. The hearing aid is then oriented with respect to the ear 21 as shown in FIGURES 1 and 1A, and the semi-flexible receiver assembly 28 and its ear tip 33 are inserted into the ear canel 25 to firmly and securely seat the hearing tip 33. Then the case of the hearing aid (22, 26) is seated in the shell-like concha 23 of the external ear, whereupon the hearing aid is ready for operation. The volume control knob 60 is adjusted so that the volume is at a comfortable listening level. The hearing aid 20 may whistle when the hand is operating the volume control knob 60, and the hand is therefore removed from adjacent the ear to test if the sound volume level is suitable. The hearing aid is likely to whistle if the ear tip 33 is not firmly seated in the ear canal 25, in which case a suitable adjustment is made. As will be noted, the resilient articulated mounting member 110 for the receiver subassembly permits the receiver to select its own best attitude with respect to the main portion of the hearing aid housing 22, 26, to fit the user's ear.

It is noted that the hearing aid 20 is "steritized" to prevent the growth of fungus and bacteria in order to protect the user, especially since the hearing aid 20 is worn in the ear canal.

It is also noted that the above-described particular embodiment of ear canal hearing aid 20 may be modified in various respects. For example, a different type of articulated mounting may be used in lieu of the articulated resilient housing and support member 110; but it has been found that the receiver subassembly 28 utilizing resilient articulated mounting 110 as herein disclosed has a number of important advantages from the viewpoint of production and use.

It will be apparent from the foregoing description that the above-described new improved hearing aid 20 of the present invention achieves the important objects and advantages set forth earlier in this application, and overcome the shortcomings of comparable "in the ear" hearing aid devices heretofore available.

While we have thus described preferred embodiments of the present invention, variations thereof will be suggested to those skilled in the art. It must, therefore, be emphasized that the foregoing description is meant to be illustrative only and should not be considered limitative of our invention. All such variations and modifications as are in accord with the principles described are meant to be included within the proper scope of the appended claims.

Having thus described our invention, we claim:

1. A hearing aid comprising: first means including a housing with a microphone and associated amplifier means therein, said first means adapted to be received within the outer ear of a human; unitary articulated receiver mounting means of flexible material having a portion secured to said housing and another portion for mounting a receiver unit so that it may be disposed at different angles with respect to said housing; and elongated receiver unit mounted on said housing by said articulated receiver mounting means with one end close to but spaced from said housing by a short post section of said mounting means, said receiver unit being electrically connected with said amplifier means.

2. A hearing aid as defined in claim 1 wherein a portion of said housing defines an aperture and a recess for a movable battery holder, and further comprising: positive and negative contacts for electrically activated components of said hearing aid; and movable battery holding means for causing engagement and disengagement of positive and negative portions of a battery therein with said contact means.

3. A hearing aid as defined in claim 1 wherein said receiver means also includes a tubular removable tip of flexible material having a peripheral portion adapted to sealingly engage a human ear canal.

4. A hearing aid as defined in claim 1, said first-mentioned means further comprising: externally adjustable volume control means for said amplifier means.

5. A hearing aid comprising: first means including a microphone and associated amplifier means, said first means being adapted to be received within the outer ear of a human; a receiver subassembly for disposition within a human ear canal, said receiver subassembly including a receiver unit electrically connected with said amplifier means and having a sound outlet, and an acoustic labyrinth means associated with the sound outlet of said receiver unit to extend the length of travel of sound passing from the receiver unit to the sound outlet of said receiver subassembly.

6. A hearing aid unit as defined in claim 5, further comprising: articulated means mounting said receiver subassembly on said first means; said articulated means being a unitary member of flexible material which supports said receiver unit and acoustic labyrinth means associated therewith in such manner as to permit the receiver subassembly to be disposed at different angles with respect to said first-mentioned means.

7. A hearing aid as defined in claim 5 wherein a portion o fsaid housing defines an aperture and a recess for a movable battery holder, and further comprising: positive an negative contacts for said microphone and associated amplifier means; and movable battery holding means for causing engagement and disengagement of positive and negative portions of a battery therein with said contact means.

8. A hearing aid as defined in claim 7, wherein: said battery holder is displaceable so that at least one of said contact means is no longer in engagement with a battery in said holder, thereby cutting off power supply to said amplifier means.

9. A hearing aid as defined in claim 8, wherein: said first-mentioned means includes an aperture disposed near said battery holder so that insertion of an object through said aperture will displace said battery holder to disengage a battery in the holder from at least one of said contact means.

10. A hearing aid unit as defined in claim 6, wherein: said receiver subassembly also includes a removable tubular ear tip of flexible material having a peripheral portion adapted to sealingly engage a human ear canal.

11. A hearing aid as defined in claim 10, wherein: said ear tip on said receiver is generally cup-shaped and has a peripheral annular end flange and a sound passage aperture in the end thereof.

12. A hearing aid unit as defined in claim 5, wherein said first-mentioned means further comprises: externally adjustable volume control means for said amplifier means, said volume control means including operating means adapted to be outwardly disposed so that the volume level is adjustable when the hearing aid unit is in a human ear.

13. A hearing aid comprising: a housing; a microphone and amplifier means within said housing; positive and negative battery contact means within said housing; said housing including a recess for accommodating a removable battery holder; said contact means including resilient portions adapted to respectively engage positive and negative portions of a battery in said battery holder when the latter is substantially fully inserted in said housing; a receiver assembly mounted on said housing, said receiver assembly including a receiver unit having a sound outlet and being connected with said amplifier means, and acoustic labyrinth means associated with the sound outlet of said receiver unit to extend the length of travel of the sound passing from the receiver unit to the sound outlet of said receiver assembly.

14. A hearing aid unit as defined in claim 13 wherein: said receiver assembly includes articulated means in the form of a unitary member of flexible material which supports said receiver unit and associated acoustic labyrinth means in such manner as to permit the latter to be disposed at different angles with respect to said housing.

15. A hearing aid unit as defined in claim 13, further comprising: a volume control within said housing for said amplifier means, said volume control including finger-operated means extending outside the hearing aid housing for adjustment of the volume level of the hearing aid.

16. A hearing aid as defined in claim 13, further comprising: a displaceable battery holder disposed within said housing.

17. A hearing aid as defined in claim 16, wherein said housing includes: an aperture disposed over said battery holder recess so that insertion of an object through said aperture will displace said battery holder to disengage a battery in the holder from at least one of said contact means.

18. A hearing aid unit as defined in claim 13, wherein: said receiver assembly also includes a generally cup-shaped ear tip of flexible material having a peripheral annular end flange adapted to sealingly engage a human ear canal, and sound passage aperture in the end of said tip, said ear tip being removably mounted on a portion of said receiver assembly whereby said ear tip aperture is adjacent said sound outlet of said receiver assembly.

19. A hearing aid as defined in claim 13, wherein: said battery contact means are parts of a member having a portion serving as a partition for the battery recess and also another portion constituting at least part of one wall of said housing which supports said receiver assembly.

20. A hearing aid unit as defined in claim 14, wherein: said receiver unit is relatively elongated and has its sound outlet disposed adjacent said articulated support means mounted on said housing; and comprising a cover plate sealed to said receiver unit with an aperture in said cover plate coincident with the sound outlet of the receiver unit; said acoustic labyrinth means being an L-shaped member with a longer and a shorter portion and having a labyrinth path formed in the longer portion thereof beginning adjacent said receiver sound outlet and terminating adjacent a sound outlet aperture provided in the shorter portion thereof; said L-shaped labyrinth member being sealed to said receiver cover plate; and further comprising means enclosing the end of said receiver unit and said short portion of said L-shaped labyrinth member.

21. A case for a hearing aid which has a microphone and amplifier housing adapted to be disposed in a human ear with a receiver assembly mounted thereon which is adapted to be disposed within a human ear canal, and including a battery holder in said housing which is displaceable to cut off supply of power from the battery to the amplifier in said housing which also has an aperture disposed near said battery holder so that insertion of an object through said aperture will displace said battery holder to cut off said power supply, said case comprising: a box-like enclosure; a built-up portion within said box-like enclosure having a cut-out section to accommodate said hearing aid with said hearing aid housing and receiver assembly oriented in a predetermined manner, and with said aperture in said housing disposed toward the bottom of said box-like enclosure; and a pin extending from the bottom of said box-like enclosure within said cut-out section and adapted to be received in said aperture of said hearing aid housing, said pin being of such length that it will displace said battery holder to sufficient extent to disconnect the battery therein from associated contacts connected with said amplifier when the hearing aid is placed within said cut-out portion in said case.

22. A hearing aid device comprising: a housing; a microphone and a chassis including amplifier means within said housing; positive and negative battery contact means within said housing; said housing including a recess for accommodating a removable battery holder, part of one of said contact means partitioning said housing and serving as a wall of said battery holder recess; each of said contact means including a resilient portion adapted to respectively engage a positive and negative portion of the battery in said battery holder when the latter is substantially fully inserted in said housing; an aperture in said housing disposed over said battery holder recess so that insertion of an object through said aperture will displace said battery holder to disengage a battery in the holder from at least one of said contact means; a volume control in said housing for said amplifier means, said volume control including operating means extending without the hearing aid housing for adjustment of the volume level of the hearing.

23. A receiver device for a hearing aid unit comprising: a relatively elongated receiver unit having a sound outlet disposed adjacent one end thereof; a cover plate sealed to said receiver unit with an aperture in said cover plate coincident with said sound outlet of the receiver unit; acoustic labyrinth means comprising an L-shaped member having longer and shorter portions with a labyrinth path formed in the longer portion thereof and terminating adjacent a sound outlet aperture provided in the shorter portion thereof, said L-shaped labyrinth member being sealed to said cover plate with said receiver unit sound outlet disposed adjacent the beginning of said labyrinth path.

24. A hearing aid receiver assembly as defined in claim 23, further comprising: an articulated resilient mounting and housing in the form of a unitary member of flexible material including a base portion, a post portion extending from said base portion, and a hood portion extending from said post portion, said receiver and labyrinth subassembly being mounted in said hood portion with the sound outlet in the short portion of said L-shaped member being disposed externally of said hood portion.

25. A hearing aid chassis comprising: a chassis base plate including a printed circuit thereon; means constituting an amplifier mounted on said base plate; first contact means electrically connected to a part of said printed circuit on said base plate, said contact means including two relatively enlarged areas forming a pair of walls around part of said chassis base plate; second contact means electrically connected to a portion of the circuit on said base plate; adjustable volume control means mounted on said base plate and electrically connected with portions of said circuit on the base plate.

References Cited by the Examiner

UNITED STATES PATENTS 3,209,082   9/1965   McCarrell et al. _____ 179—107

OTHER REFERENCES

German Auslegeschrift 1,180,417, Wullstein, December 1960.

KATHLEEN H. CLAFFY, *Primary Examiner.*

F. N. CARTEN, *Assistant Examiner.*